United States Patent
Shiraishi et al.

(10) Patent No.: US 6,898,840 B1
(45) Date of Patent: May 31, 2005

(54) METHOD OF FABRICATING A MAGNETIC HEAD DEVICE

(75) Inventors: Masashi Shiraishi, Saku (JP); Izumi Nomura, Tokyo (JP); Tsutomu Aoyama, Ichikawa (JP); Isamu Sato, Tokyo (JP); Masanori Sakai, Nagano-ken (JP); Tsuyoshi Umehara, Saku (JP); Kenichi Takano, Saku (JP); Haruyuki Morita, Komoro (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/506,224

(22) Filed: Feb. 17, 2000

Related U.S. Application Data

(62) Division of application No. 09/033,789, filed on Mar. 3, 1998, now Pat. No. 6,084,746.

(30) Foreign Application Priority Data

| Mar. 4, 1997 | (JP) | ................................... 9-48641 |
| Nov. 10, 1997 | (JP) | ................................. 9-321950 |
| Mar. 2, 1998 | (JP) | ................................ 10-49105 |

(51) Int. Cl.⁷ .............................. G11B 5/53; G11B 5/48
(52) U.S. Cl. ............................ 29/603.04; 29/603.03; 29/840; 29/832; 360/264; 360/244.1
(58) Field of Search .................. 29/603.03, 603.04, 29/603.05, 603.07, 603.19, 832, 840; 360/264, 264.2, 244.1, 245.8

(56) References Cited

U.S. PATENT DOCUMENTS

| 3,832,769 A | * | 9/1974 | Olyphant et al. | ......... 29/840 X |
| 4,443,824 A | * | 4/1984 | Frater et al. | ................ 360/264 |
| 4,809,103 A | | 2/1989 | Lazzari | |
| 5,006,946 A | | 4/1991 | Matsuzaki | |
| 5,014,145 A | * | 5/1991 | Hosokawa et al. | ...... 360/244.1 |
| 5,055,969 A | * | 10/1991 | Putnam | ...................... 360/104 |
| 5,065,271 A | * | 11/1991 | Matsuura et al. | ........... 360/104 |
| 5,199,090 A | | 3/1993 | Bell | |
| 5,199,190 A | | 4/1993 | Bell | ............. 385/31 |

FOREIGN PATENT DOCUMENTS

| JP | 53-69623 | 6/1978 |
| JP | 3-25717 | 2/1991 |
| JP | 3-71493 | 7/1991 |
| JP | 3-85641 | 8/1991 |
| JP | 5-109002 | 4/1993 |
| JP | 5-55557 | 7/1993 |
| JP | 5-55572 | 7/1993 |
| JP | 6-140466 | 5/1994 |
| JP | 6-195668 | 7/1994 |
| JP | 6-70848 | 9/1994 |

OTHER PUBLICATIONS

Patent Abstracts of Japan, vol. 15, No. 305 (P–1234), Aug. 5, 1991, JP–03–108120 A (Mitsubishi Electric Corp.).
"Magnetic Head Assembly and Electronic Circuitry", J. E. Hitchner et al., IBM Technical Bulletin, vol. 25, No. 7A, Dec. 1982.
Patent Abstracts of Japan, vol. 15, No. 305 (P–1234), Aug. 4, 1991, JP–03–10812–A (Mitsubishi Electric Corp.).

* cited by examiner

*Primary Examiner*—A. Dexter Tugbang
(74) *Attorney, Agent, or Firm*—Cohen, Pontani, Lieberman & Pavane

(57) ABSTRACT

A method of fabricating a magnetic head device comprising a slider having a magnetic head element, a suspension structure made of a thin resilient material and having one end supporting the slider and the other end to be attached to another member, and a head IC chip. The head IC chip is mounted on the suspension structure so as to face a magnetic recording disc and at a position spaced from the slider-supporting one end of the suspension structure by an intervening portion of the suspension structure. The position is selected so that the intervening portion is effective to suppress a temperature increase in the head IC chip due to at least thermal conduction through the intervening portion.

12 Claims, 13 Drawing Sheets

FIG. 13
(A) 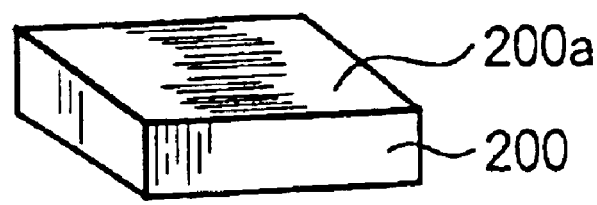
(B) 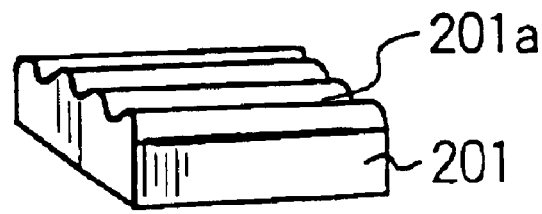
(C) 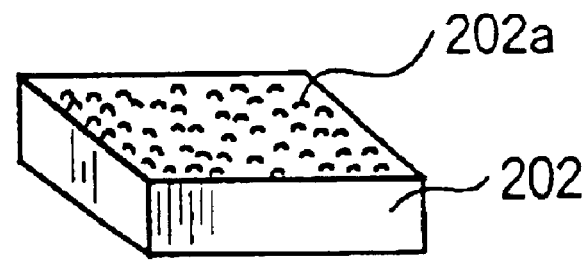
(D) 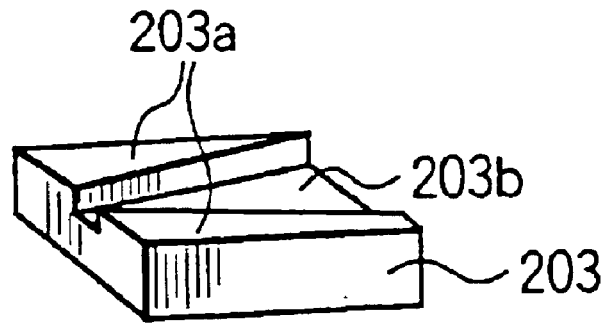

METHOD OF FABRICATING A MAGNETIC HEAD DEVICE

PRIORITY CLAIM AND RELATED APPLICATIONS

This is a Divisional of application Ser. No. 09/033,789 filed on Mar. 3, 1998 and now issued as U.S. Pat. No. 6,084,746.

FIELD OF THE INVENTION

The present invention relates to a magnetic head device including a slider having a magnetic head mounted thereon, a resilient suspension structure carrying the slider and a head IC chip. The present invention further pertains to a magnetic disc device provided with such magnetic head device.

PRIOR ART

In conventional magnetic head devices having a magnetic head for writing and/or reading information on a magnetic recording medium such as a magnetic disc, it has been common to mount the magnetic head on a slider which is maintained in a floating relationship with respect to the magnetic recording medium. The slider is generally formed from a resilient metallic material sheet which is arranged to extend from a movable arm structure and supported by a suspension member.

The movable arm is provided for supporting one end of the suspension member and it has been common to mount a head IC chip on the movable arm. The head IC is provided for including electronic circuits for amplifying writing current which is to be suppled to the magnetic head and reading voltage from the magnetic head, and for controlling the writing and/or reading operation. In an arrangement wherein the head IC chip is mounted on the movable arm, an increased length of connecting lead is required between the head IC chip and the magnetic head and this increased length of the connecting lead may be a cause of noise generation. Such increased length of the connecting lead may produce a parasitic capacitance and an inductance which have an effect of undesirably increasing rising time and falling time of pulse signals. Thus, high speed data transmission will be disturbed.

In order to solve the problems, there has been proposed by the Japanese Laid-Open Patent Publication No. Sho 53-69623 to mount the head IC chip on the slider. Further, the Japanese Laid-Open Patent Publication No. Hei 3-108120 proposes to divide the head IC into an IC main body and an IC sub-body, and mount the IC main body on the movable arm supporting the suspension member and the IC sub-body on the slider or the suspension member.

In these known structures, it is possible to decrease to a certain extent the distance between the head IC chip and the magnetic head so that it may be possible to suppress noise which may otherwise be produced because of the length of the connecting lead. However, the structure has another unsolved problem in that the temperature of the IC chip is increased due to the writing current which flows through the head IC chip during recording operation. It should further be noted that in the structure the IC chip is located close to the magnetic head so that the magnetic head may receive an adverse thermal effect from the head IC chip which generally generates heat in operation.

More specifically, in a structure where the head IC chip is mounted on the movable arm which has a sufficient thermal capacity as well as a substantial area for heat radiation, the temperature of the IC chip can be maintained sufficiently low. Further, since the head IC chip is located far from the magnetic head, there is least possibility that the magnetic head is adversely affected by the heat generated in the head IC chip. To the contrary, where the head IC chip is located on the slider, it is difficult to ensure sufficient surface area for heat dissipation so that it cannot be expected to have the temperature of the IC chip decreased through dissipation of heat. It should further be noted that the slider usually has a limited thermal capacity so that it cannot be an effective tool for providing a temperature decrease through thermal conduction. As a result, there will be a possibility in the aforementioned structures that the temperature of the head IC chip is undesirably increased to an extent that the reliability of the IC chip will be lowered. It should further be noted that since the magnetic head is located close to the head IC chip, the magnetic head is thermally affected by the heat generated in the head IC chip. Thus, the temperature of the magnetic head itself may increase to an unacceptable level. A similar problem will also be encountered in a structure where the head IC chip is located on the suspension member if the location of the head IC chip is close to a tip end of the suspension member.

SUMMARY OF THE INVENTION

It is therefore an object of the present invention to provide a technique wherein the temperature increase in the head IC chip in a magnetic head device of the type as described above can be suppressed to a satisfactory level and the heat generated in the head IC chip is effectively prevented from being transmitted to the magnetic head.

This and other objects are attained in accordance with one aspect of the present invention directed to a method of fabricating a magnetic head device comprising a slider having a magnetic head element, a suspension structure made of a thin resilient material and having one end supporting the slider and the other end to be attached to another member, and a head IC chip. The head IC chip is mounted on the suspension structure so as to face a magnetic recording disc and at a position spaced from the slider-supporting one end of the suspension structure by an intervening portion of the suspension structure. The position is selected so that the intervening portion is effective to suppress a temperature increase in the head IC chip due to at least thermal conduction through the intervening portion.

Another aspect of the present invention is directed to a method of increasing cooling of a head IC chip in the above-described magnetic head device. The head IC chip is mounted on the suspension structure so as to face a magnetic recording disc and at a position spaced from the slider-supporting one end of the suspension structure by an intervening portion of the suspension structure. The position is selected so that the intervening portion is effective to suppress a temperature increase in the head IC chip due to at least thermal conduction through the intervening portion.

Another aspect of the present invention is directed to a method of increasing cooling of a head IC chip in the above-described magnetic head device. The head IC chip is mounted on the suspension structure so as to face a magnetic recording disc and at a position spaced from the slider-supporting one end of the suspension structure. The slider is mounted on the slider-supporting one end of the suspension structure so as to face a magnetic recording disc. The head IC chip position is defined by, $$0.2 \leq Lb/La \leq 1$$

where La is a distance between the slider and a point of attachment of the suspension structure to said other member, and Lb is a distance between the slider and the head IC chip.

Another aspect of the present invention is directed to a method of fabricating a magnetic disc device comprising a magnetic head device including a slider having a magnetic head element and a suspension structure having one end supporting the slider, a rotatable magnetic disc, a head IC chip which is a separately-formed component from the slider, and an electrically conductive connecting device for establishing an electrical connection between the magnetic head element and the head IC chip. The head IC chip is mounted on the connecting device so as to face the magnetic disc which is rotated at least when the head IC chip is in operation. The mounting position of the head IC chip on the connecting device is selected to be where the head IC chip is always exposed to a flow of air produced by rotations of the magnetic disc so that the head IC chip is continuously cooled by the flow of air at least when the head IC chip is in operation.

Another aspect of the present invention is directed to a method of increasing cooling of a head IC chip in a magnetic disc device comprising a magnetic head device including a slider having a magnetic head element and a suspension structure having one end supporting the slider, a rotatable magnetic disc, a head IC chip which is a separately-formed component from the slider, and an electrically conductive connecting device for establishing an electrical connection between the magnetic head element and the head IC chip. The head IC chip is mounted on the connecting device so as to face the magnetic disc which is rotated at least when the head IC chip is in operation. The mounting position of the head IC chip on the connecting device is selected to be where the head IC chip is always exposed to a flow of air produced by rotations of the magnetic disc so that the head IC chip is continuously cooled by the flow of air at least when the head IC chip is in operation.

Another aspect of the present invention is directed to a method of fabricating a magnetic disc device comprising a magnetic head device including a slider having a magnetic head element and a suspension structure having one end supporting the slider, a rotatable magnetic disc, a head IC chip which is a separately-formed component from the slider, and an electrically conductive connecting device for establishing an electrical connection between the magnetic head element and the head IC chip. The head IC chip is mounted on the connecting device so as to face the magnetic disc which is rotated at least when the head IC chip is in operation. A position of the suspension structure is controlled so that the head IC chip is located inside an outer periphery of the magnetic disc at least when the head IC chip is in operation.

Another aspect of the present invention is directed to a method of increasing cooling of a head IC chip in a magnetic disc device comprising a magnetic head device including a slider having a magnetic head element and a suspension structure having one end supporting the slider, a rotatable magnetic disc, a head IC chip which is a separately-formed component from the slider, and an electrically conductive connecting device for establishing an electrical connection between the magnetic head element and the head IC chip. The head IC chip is mounted on the connecting device so as to face the magnetic disc which is rotated at least when the head IC chip is in operation. A position of the suspension structure is controlled so that the head IC chip is located inside an outer periphery of the magnetic disc at least when the head IC chip is in operation.

Another aspect of the present invention is directed to a method of fabricating a magnetic disc device comprising a magnetic head device including a slider having a magnetic head element and a suspension structure having one end supporting the slider, a rotatable magnetic disc, a head IC chip which is a separately-formed component from the slider, and an electrically conductive connecting device for establishing an electrical connection between the magnetic head element and the head IC chip. The head IC chip is mounted on the connecting device so as to face the magnetic disc which is rotated at least when the head IC chip is in operation. The mounting position of the head IC chip on the connecting device is selected to be where the head IC chip is always exposed to a flow of air produced by rotations of the magnetic disc so that the head IC chip is continuously cooled by the flow of air at least when the head IC chip is in operation. The head IC chip is arranged to be located with respect to the magnetic disc with a distance between opposing surfaces of the head IC ship and the magnetic disc smaller than 1000 $\mu$m.

Another aspect of the present invention is directed to a method of increasing cooling of a head IC chip in a magnetic disc device comprising a magnetic head device including a slider having a magnetic head element and a suspension structure having one end supporting the slider, a rotatable magnetic disc, a head IC chip which is a separately-formed component from the slider, and an electrically conductive connecting device for establishing an electrical connection between the magnetic head element and the head IC chip. The head IC chip is mounted on the connecting device so as to face the magnetic disc which is rotated at least when the head IC chip is in operation. The mounting position of the head IC chip on the connecting device is selected to be where the head IC chip is always exposed to a flow of air produced by rotations of the magnetic disc so that the head IC chip is continuously cooled by the flow of air at least when the head IC chip is in operation. The head IC chip is arranged to be located with respect to the magnetic disc with a distance between opposing surfaces of the head IC chip and the magnetic disc smaller than 1000 $\mu$m.

The magnetic head device includes a slider having a magnetic head thereon, a suspension structure formed from a resilient metallic sheet and having one end supporting the slider, and a head IC chip, the suspension structure being attached at the other end to another member such as a movable arm, the head IC chip being mounted on the suspension structure at a location defined by $0.2 \leq Lb/La \leq 1$, where La is a distance between the slider and the point of connection of the slider to the aforementioned other member, and Lb is a distance between the slider and the head IC chip.

Where the head IC chip is mounted on the suspension structure at the side facing the magnetic recording medium, the magnetic recording medium is moved relative to the slider and the head IC chip and there is produced flow of air between the magnetic recording medium and the slider and also between the magnetic recording medium and the head IC chip. Usually, the slider and the head IC chip are held stationary and the magnetic recording medium is in the form of a rotatably driven disc. Then, flow of air is produced as the magnetic recording disc rotates in the vicinity of the surface of the disc and serves to cool off the head IC chip. As the result, the temperature of the head IC chip can be suppressed to a substantially low value.

In this aspect of the present invention, it is It is in the mounted state from the suspension structure is smaller than the height of the slider. In this instance, the head IC chip is preferably in the form of a bare chip which is preferably mounted or attached to the suspension structure by means of flip-chip-bonding. By adopting the flip-chip-bonding for mounting such bare chip, it is possible to decrease the height of the head IC chip in the mounted state. Therefore, with this arrangement, the IC chip can be mounted on the recording medium side of the suspension structure without having any risk of the head IC chip interfering with the magnetic recording medium in use.

In an arrangement wherein the suspension structure is attached at the other end to the other member such as a movable arm, it is preferable that the location of the head IC chip on the suspension structure be, in terms of La which is a distance between the slider and the point of connection of the slider to the aforementioned other member, and Lb which is a distance between the slider and the head IC chip, within a range $0.2 \leq Lb/La \leq 1$, more preferably within a range $0.3 \leq Lb/La \leq 0.7$, and most preferably within a range $0.4 \leq Lb/La \leq 0.6$.

In a structure wherein the head IC chip is mounted on the suspension structure, it may be possible because of a thin structure of the suspension that heat may not be sufficiently dissipated nor conducted depending on the location of the head IC chip as described with reference to the prior art. Thus, there is a risk that the temperature of the IC chip is increased to an unacceptable level and the magnetic head may receive an adverse thermal effect from the high temperature IC chip. It has now been found that the temperature of the head IC chip is greatly increased when the IC chip is mounted on the suspension structure at a location close to its tip end. The reason for this is understood that the thermal conduction takes place substantially in one direction only so that the IC chip cannot be cooled off sufficiently. It has also been realized that the temperature of the magnetic head increases higher as the location of the IC chip becomes closer to the tip end of the suspension structure. This is because the IC chip which is considered as a heat source is located close to the magnetic head. It has also been found that, in the structure of the aforementioned prior art wherein the head IC chip is mounted on the slider, both the temperature of the IC chip itself and that of the magnetic head increase to an extremely high level.

It should be noted that wherein the head IC chip is mounted on the suspension structure at the side facing the magnetic recording medium and the location on the suspension structure in the range as defined, it is possible to maintain the temperature of the IC chip sufficiently below an acceptable level and to suppress the temperature of the magnetic head to a low value.

The suspension structure may be made of a resilient metallic material such as a corrosion resistant steel. It is preferable that the head IC chip be attached to a surface of the suspension structure through a layer of an electrically insulating material such as a resin material like polyimide.

The suspension structure can comprise a load beam formed from resilient metallic material such as a corrosion resistant steel, and a flexure member made of a resilient metallic material such as a corrosion resistant steel having a width smaller than the load beam and provided on a side of the load beam where the head IC chip is to be attached. It is preferable that the flexure member is coated with a first layer of an insulating material such as a resin material like polyimide, and at least one conductive layer is provided on the first insulating layer to form a portion of connecting lead or leads for connection with the magnetic head and the head IC chip. It is also preferable to cover the conductive layer with a second layer of an insulating material such as a resin material like polyimide. In this instance, it is preferable to locate the head IC chip on the second insulating layer and connected with the conducive layer by soldering.

Where the head IC chip is mounted on the suspension structure at the side facing to the magnetic recording medium, it is preferable that the surface of the head IC chip facing to the magnetic recording medium has such a configuration that a substantial heat dissipating area can be ensured. More specifically, the head IC chip may have a wide and flat surface at the side facing the magnetic recording medium. Alternatively, the head IC chip may have a rough surface at the side facing the magnetic recording medium or an undulated surface as well. In a still alternative structure, the head IC chip may be formed at the side facing to the magnetic recording medium with one or more grooves for allowing flow of air to pass through. The groove or each of the grooves may have a width which is large at an end opposite to the direction of movement of the magnetic recording medium with respect to the head IC chip and gradually decreasing toward the direction of the movement of the medium.

It is preferred that the head IC chip has a mass less than 1.0 mg so that the head IC chip may not have any adverse effect on the mechanical vibration characteristics of the suspension structure when the chip is mounted on the suspension structure.

It is further preferable in the magnetic head device and the magnetic disc device having a magnetic recording disc located to be opposed to the magnetic head of the magnetic head device that the spacing between mutually facing surfaces of the head IC chip and the magnetic disc is maintained to be less than 1000 $\mu$m. It has been found that with this arrangement, the cooling effect of air flow can be enhanced and the temperature of the head IC chip can always be maintained below 150° C.

It is further contemplated that there is provided a magnetic disc device comprising a magnetic head device and a rotatable magnetic recording disc. The magnetic head device includes a slider having a magnetic head thereon and a suspension structure having one end supporting the slider. The magnetic head is arranged so that it is faced to the magnetic head of the magnetic head device. There are provided a head IC chip and at least one connecting lead member for connecting the magnetic head with the head IC chip. The head IC chip is mounted on the connecting lead member at a location where the head IC chip is always exposed to flow of air which is produced by a rotation of the magnetic recording disc.

According to the arrangement wherein the head IC chip is mounted on the connecting lead member at a location where the head IC chip is always exposed to flow of air which is produced by a rotation of the magnetic recording disc, the head IC chip is always exposed to a cooling air flow throughout the stroke of the movement of the magnetic head between the inner and outer peripheries of the recording area of the magnetic recording disc so that the temperature increase in the IC chip can be substantially suppressed.

It is preferred that in the aforementioned arrangement the head IC chip is located radially inside the outer periphery of the magnetic recording disc and is opposed to the disc. It is also preferable in order to enhance the cooling effect by the air flow that the distance between the opposing surfaces of the head IC chip and the rotating magnetic recording medium is maintained to be less than 1000 $\mu$m. It is possible with this arrangement to suppress the temperature of the head well below 150° C.

BRIEF DESCRIPTION OF THE DRAWINGS

FIG. 13 shows various possible configurations of the head IC chip;

DESCRIPTION OF THE PREFERRED EMBODIMENT

Figure 1:
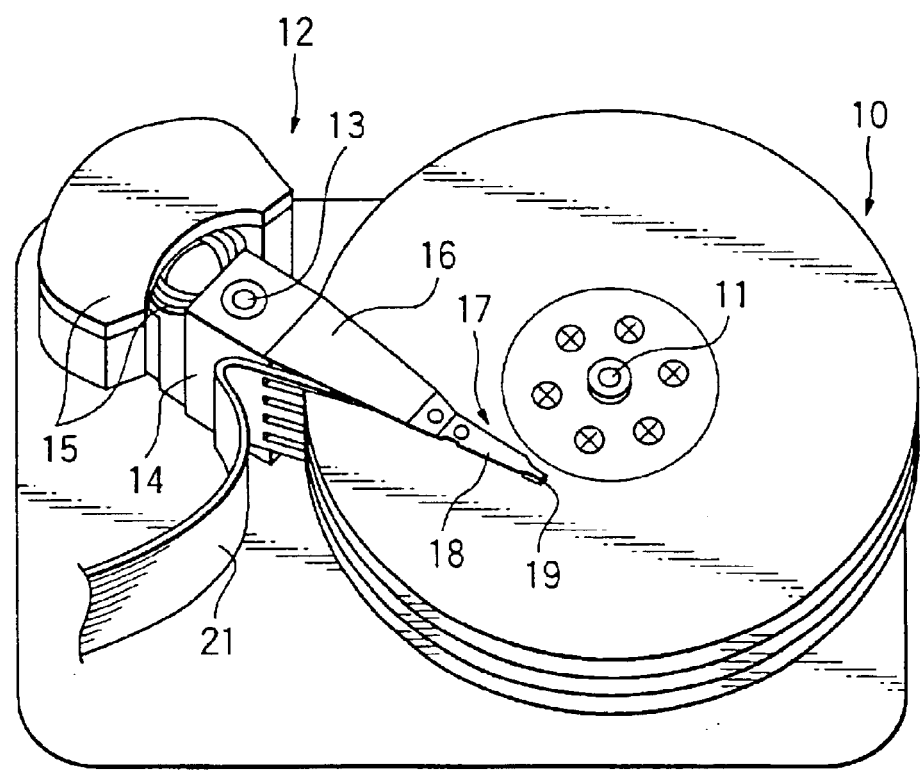
FIG. 1 is a perspective view showing essential portion of the magnetic disc device having a magnetic head device in accordance with one embodiment of the present invention.
Figure 2:
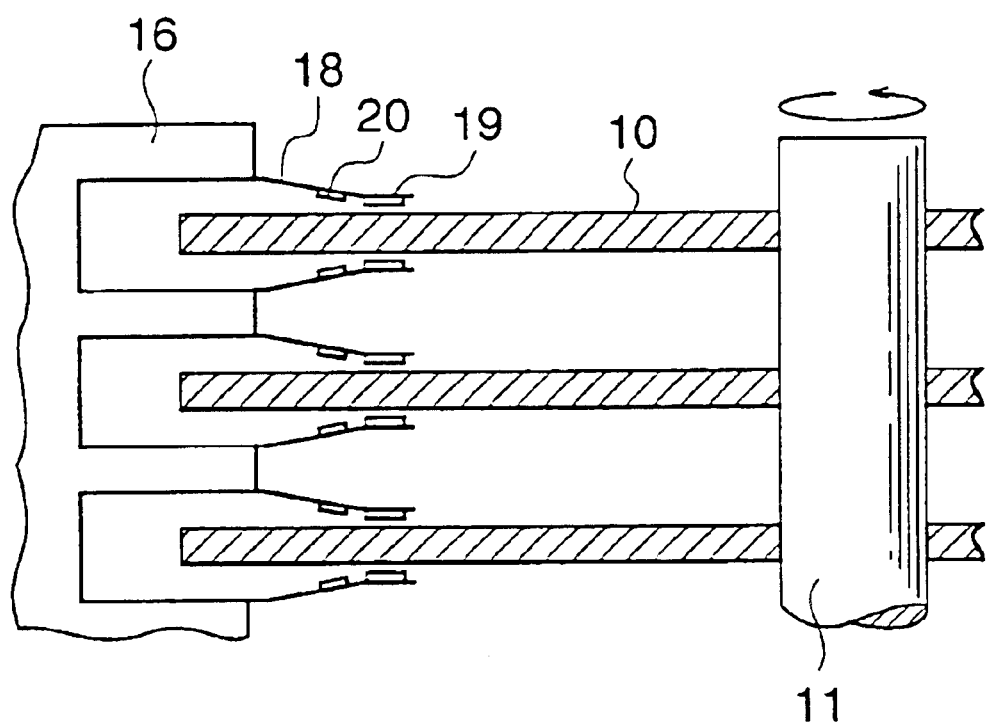
FIG. 2 is a side view showing a carriage arrangement adopted in the embodiment shown in FIG. 1.

Referring now to the drawings, particularly to FIG. 1, there is shown in a perspective view a magnetic disc device using a magnetic head device in accordance with one embodiment of the present invention. FIG. 2 shows a carriage assembly used in the magnetic disc device shown in FIG. 1.

In the arrangement shown in the drawings, it will be understood that a plurality of magnetic recording discs 10 are provided for rotation about an axis of a shaft 11. The magnetic recording discs 10 are rotated by a mechanism which is well known in the art. Adjacent to the magnetic recording discs 10, there is provided a carriage assembly 12 for locating sliders with respect to the discs 10. Each of the sliders has a magnetic head mounted thereon. The carriage assembly 12 primarily comprises a carriage 14 which is rotatable about a shaft 13 and an actuator 15 such as a voice coil motor (VCM) for rotationally driving the carriage 14.

The carriage 14 supports a plurality of movable arms 16 which are stacked one over the other along the shaft 13 and attached to the carriage 14 at the base ends thereof. Each of the movable arms 16 has one or two magnetic head devices 17 mounted on tip ends of the movable arms 16. Each of the magnetic head devices 17 is structured in the form of a head suspension assembly including a suspension structure 18 carrying at its tip end a slider 19 having a magnetic head and at its intermediate portion a head IC chip 20. Both of the slider 19 and the head IC chip 20 are mounted on the suspension structure 18 at a side facing one of the recording surfaces of a respective one of the magnetic recording discs 10 so that they are opposed to the one recording surface of the disc 10.

There is provided a connecting lead cable comprising a flexible print cord (FPC) 21 which is connected with an internal circuit (not shown) in the magnetic disc device. The connecting lead cable has a tip end which is divided into a plurality of end portions extending to tip ends of the respective ones of the movable arms 16 in the carriage 14.

Figure 3:
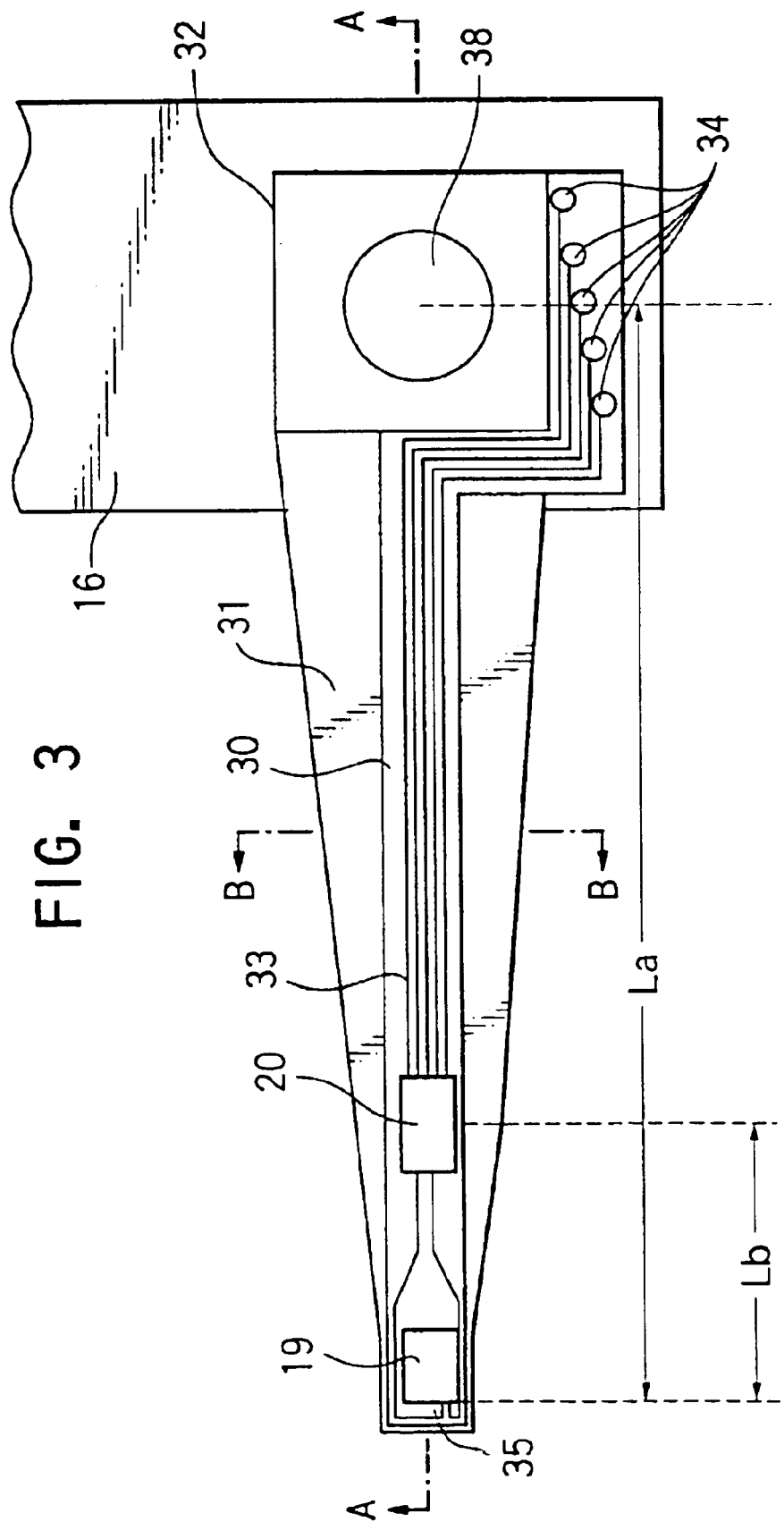
FIG. 3 is a plan view showing an example of the magnetic head device in the embodiment of FIG. 1 as seen from a side of the magnetic recording disc.
Figure 4:
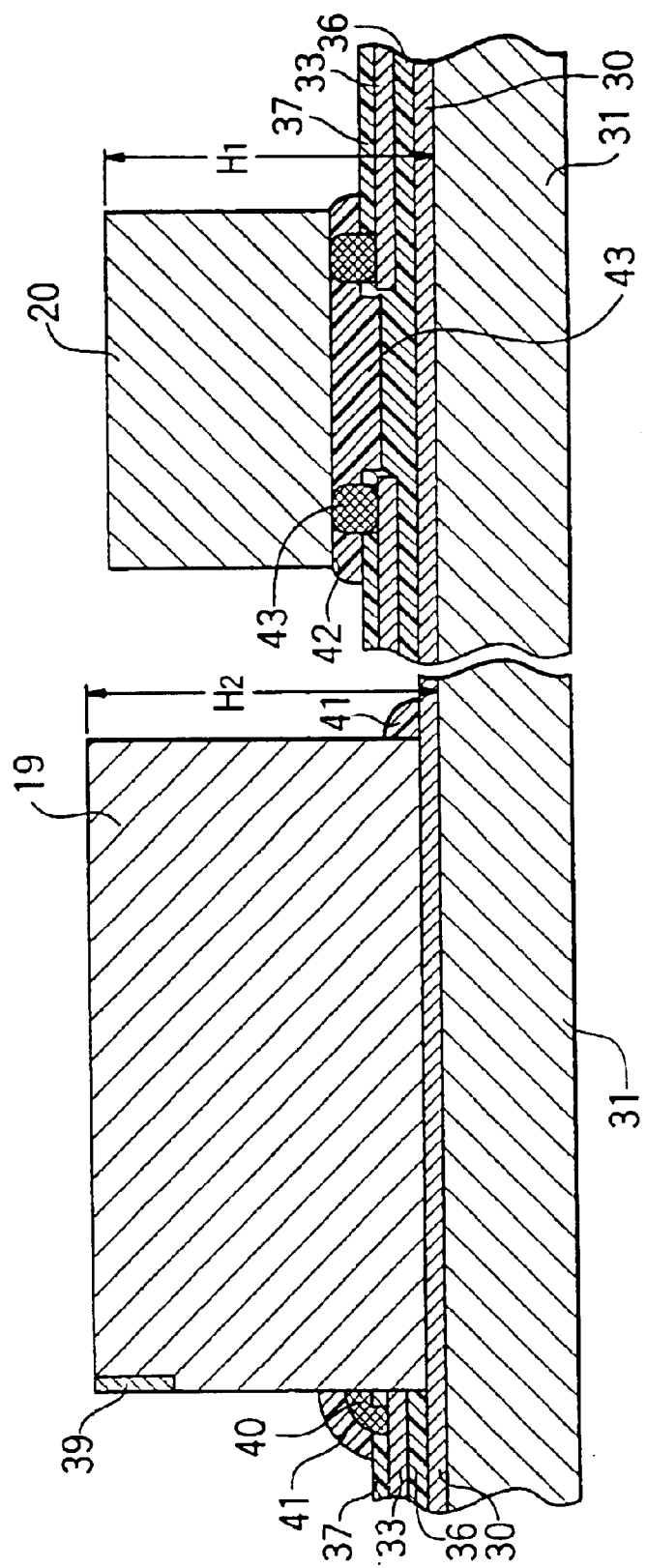
FIG. 4 is a sectional view taken substantially along the line A—A in FIG. 3.
Figure 5:
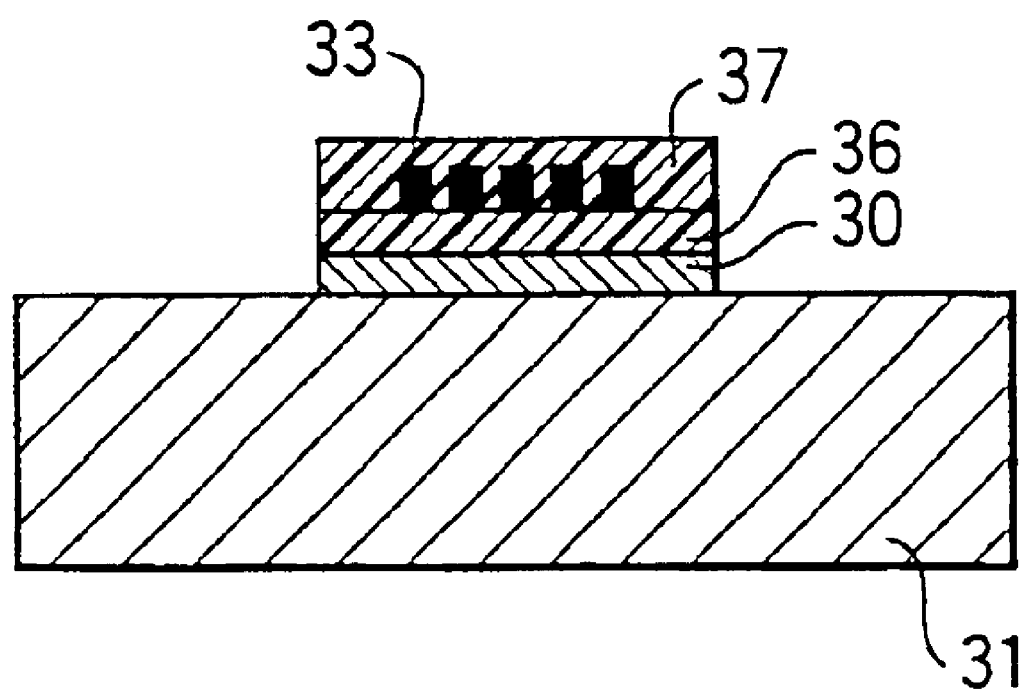
FIG. 5 is a sectional view taken substantially along the line B—B in FIG. 3.

FIG. 3 is a plan view showing the magnetic head device 17 of the embodiment of FIG. 1 as seen from the side facing the magnetic disc 10. FIG. 4 is a sectional view in an enlarged scale taken along the line A—A in FIG. 3. FIG. 5 is a sectional view taken along the line B—B in FIG. 3.

As shown in FIG. 3, the suspension structure 18 includes a load beam 31 and a flexure member 30 secured to the load beam at one side thereof. The flexure member 30 has one end carrying the slider 19 and supports the head IC chip 20 on its intermediate portion. The load beam 31 has a base plate 32 which is formed at a root end portion of the load beam 31.

In the illustrated embodiment, the flexure member 30 is made of a sheet of a corrosion resistant steel (for example, SUS304TA) of approximately 25 $\mu$m thick. The flexure member 30 is smaller in width than the load beam 31. To provide the flexure member 30 with a corrosion resistant steel sheet as described is advantageous as compared with a structure wherein the flexure member is totally made of plastics material. Where the flexure member is totally made of plastics material, flatness of the slider attachment surface may very often not be satisfactory, and the slider attachment surface may be accurately parallel with the movable arm attachment surface. By providing the flexure member 30 with a corrosion resistant steel as described, the aforementioned problems can be avoided.

On the flexure member 30, there is formed a pattern of thin film electrically conductive layer 33 providing a required number of connecting leads which extend along the length of the flexure member 30. The connecting leads of the conductive layer 33 have ends adjacent to the base plate 32 connected with connecting terminals 34 which are in turn connected with respective ones of connecting leads formed in the flexible print cord 21 constituting the connecting cable. The other ends of the connecting leads in the conductive layer 33 are connected with connecting terminals 35 provided on the tip portion of the flexure member 39.

The thin film pattern can be formed by means of a known patterning process which is generally adopted in providing a print board on a metallic plate. More specifically, as shown in FIGS. 4 and 5, the flexure member 30 is covered by a first layer 36 of an electrical insulation material such as a resin material like polyimide. The first layer may be approximately 5 $\mu$m thick. On the first layer 36, there is formed a patterned layer 33 of an electrically conductive material such as copper, which is covered by a second layer 37 of an electrical insulation material such as a resin like polyimide. The second layer 37 may be 5 $\mu$m thick. These layers can be formed in this order on the flexure member 30 by a laminating technique. The connecting terminals 34 and 35 may be formed by laminating layers of nickel or gold on the layers of copper. The connecting terminals are not covered by the second insulation layer 37. In FIG. 3, the conductive layer 33 is shown by solid lines for clarity although it is covered by the second insulation layer 37.

The load beam 31 is made of a corrosion resistant steel sheet having a thickness of approximately 70 to 75 µm and is configured to have a width gradually decreasing from the end adjacent to the base plate to the tip. The load beam 31 supports the flexure member 30 throughout its length. The flexure member 30 is connected to the load beam 31 through a plurality of welding points.

The base plate 32 is made of a corrosion resistant steel or iron and secured to the base portion of the load beam by welding. The suspension structure 18 is attached to the movable arm 16 by securing the base plate 32 thereto at the attachment 38. The base plate 32 may not necessarily be a separate part but may be made integrally with the load beam 31.

The slider 19 having a magnetic head 39 is mounted on the flexure member 30. In FIG. 3, it will be noted that the conductive layer 33 providing a required number of leads passes along the opposite sides of the slider 19 to the tip end of the flexure member 30 and then turned back from the tip end of the flexure member 30 to be connected with input and output electrodes provided on the slider 19. The portion connecting the conductive layer 33 to the electrodes on the slider 19 is covered by a layer 41 of an electrical insulation material such as a resin. Although not shown in the drawings, the flexure member 30 and the load beam 31 may be dimpled at the portion where the slider 19 is to be mounted.

The head IC chip 20 is mounted on the suspension structure 18 at an intermediate portion of its length on the side where the slider 19 is to be mounted. In other words, the head IC chip 20 is mounted on the side of the suspension structure 18 which is opposed to the magnetic disc 10. The head IC chip 20 is preferably in the form of a bare chip desirably having a mass of less than 1.0 mg. With this light weight structure, it is possible to suppress any undesirable mechanical vibration when the chip 20 is mounted on the suspension structure 18.

As shown in detail in FIG. 4, the head IC chip 20 is connected by means of a flip-chip bonding using a solder 42 with the conductive layer 33 which is formed on the flexure member 30 of the suspension structure 18 through the first insulation layer 36. The gap between the lower surface of the head IC chip 20 and the first insulation layer 36 and the second insulation layer 37 is filled with a layer 43 of an insulation material having a good thermal conductivity such as a mixture of a resin like polyimide and an electrical insulation material so that heat generated in the IC chip 20 is dissipated through conduction through the insulation layer 43 to the suspension structure 18.

As already described, the head IC chip 20 is mounted on the suspension structure 18 at the side facing the magnetic disc 10 which is rotated with respect to the slider 16 and head IC chip 20 which are held stationary. Thus, flow of air produced by the rotating magnetic disc 10 in the vicinity of the surface thereof flows around the head IC chip 20 to cool the IC chip. It is therefore possible to suppress increase in temperature of the IC chip 20 to a substantial extent even when the writing current is flowing through the IC chip. As the result, it is also possible to suppress increase in temperature of the slider 19.

Figure 6:
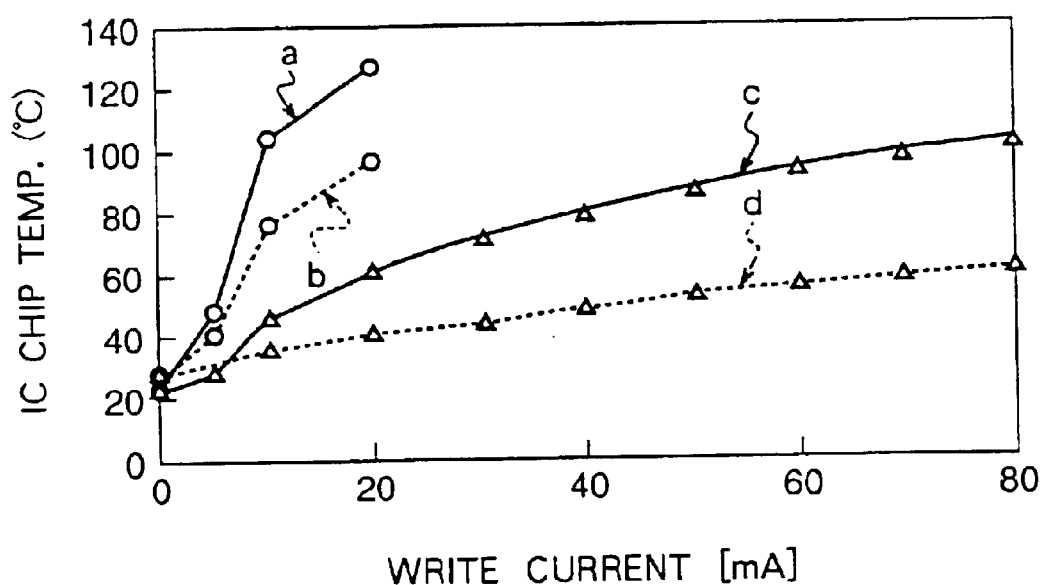
FIG. 6 is a diagram showing the temperature change in the IC chip in relation to the writing current.
Figure 7:
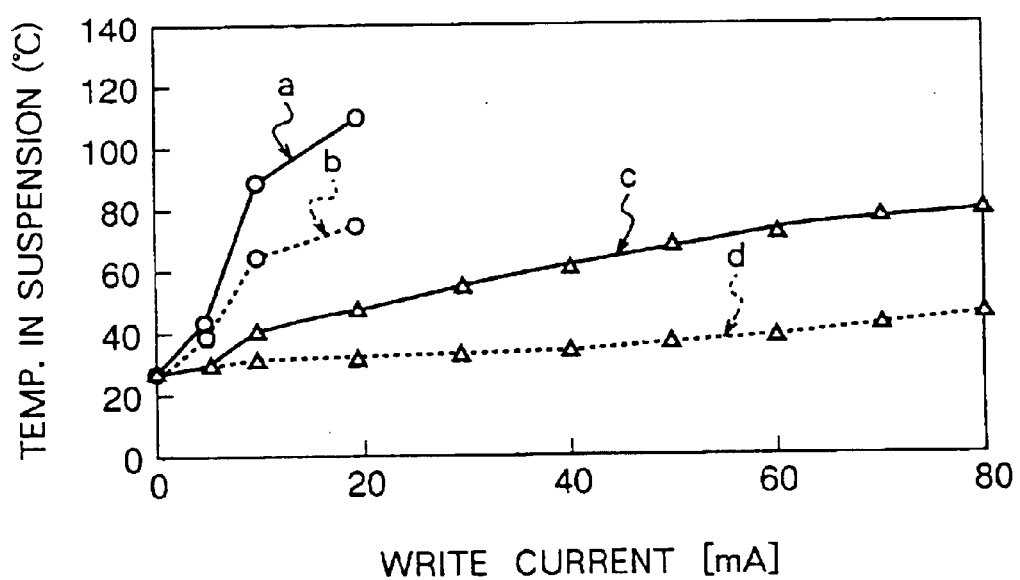
FIG. 7 is a diagram showing the temperature change in the suspension structure at the side opposite to the IC chip in relation to the writing current.
Figure 8:
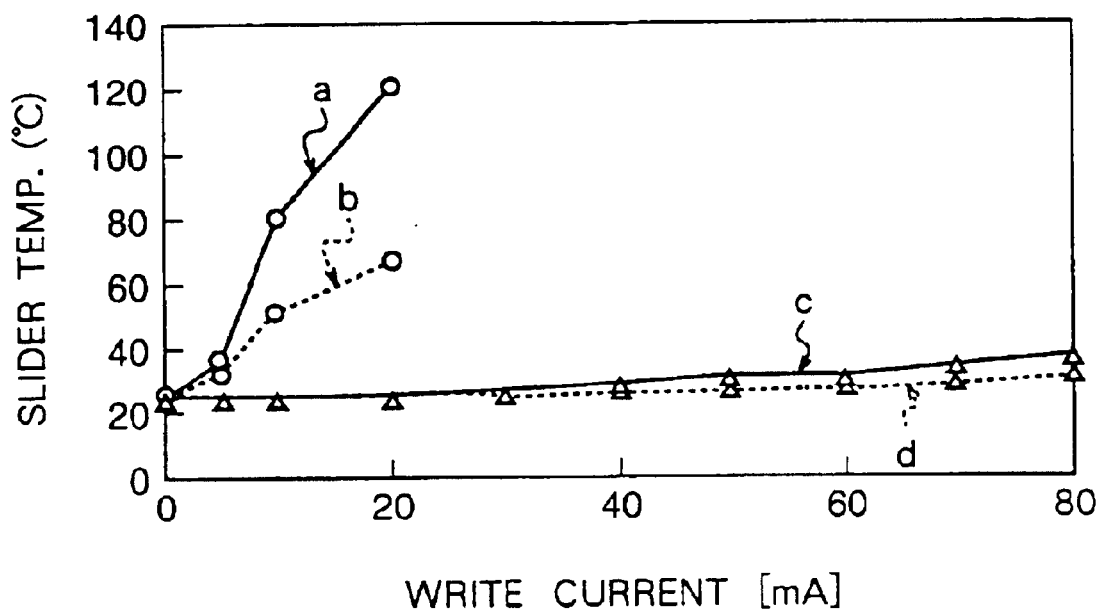
FIG. 8 is a diagram showing the temperature change in the slider in relation to the writing current.
Figure 9:
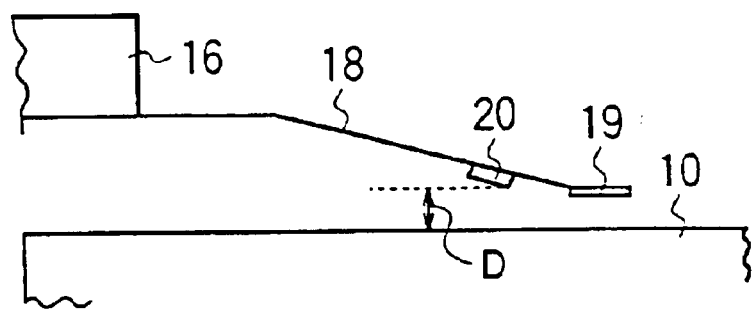
FIG. 9 is a diagrammatical illustration designating the distance D between opposing surfaces of the head IC chip and the magnetic recording disc in the embodiment of FIG. 1.

Referring to FIGS. 6, 7 and 8, there are respectively shown the temperature change in head IC chip 20, the temperature change in the surface of the suspension structure 18 at the location of IC chip and the temperature change of the slider 19 with respect to a change in the write current. In the drawings, the curve a designates the temperature when the write current is continuously supplied while the magnetic disc 10 is stationary, b the temperature when the write current of 50% duty factor is supplied while the magnetic disc 10 is stationary, c the temperature when the write current is continuously supplied while the magnetic disc 10 is rotated with a linear speed of 24.9 m/sec, and d the temperature when the write-in current of 50% duty factor is supplied while the magnetic disc 10 is rotated with a linear speed of 24.9 m/sec.

In FIGS. 6 and 7, it will be understood that the temperature increase in the head IC chip 20 itself and that in the chip mounting surface of the suspension structure 18 can be suppressed to a substantial degree when the magnetic disc 10 is rotated as compared with the situation wherein the magnetic disc 10 is stationary, since the head IC chip 20 is cooled by the flow of air which is produced by the rotating magnetic disc 10. It will also be noted in FIG. 8 that the temperature increase in the slider 19 can be maintained at a low value when the magnetic disc is rotated. This is because the temperature in the head IC chip 20 does not increase to a noticeable level and the slider 19 itself is also cooled by the flow of air.

In order that the head IC chip 20 be effectively cooled by the flow of air produced by the rotating magnetic disc 10, it is desirable to maintain as small as possible the distance D between the IC chip 20 and the surface of the magnetic disc 10 facing the IC chip 20. It should however be noted that care must be taken that the head IC chip 20 does not contact with the surface of the magnetic disc 10.

Figure 10:
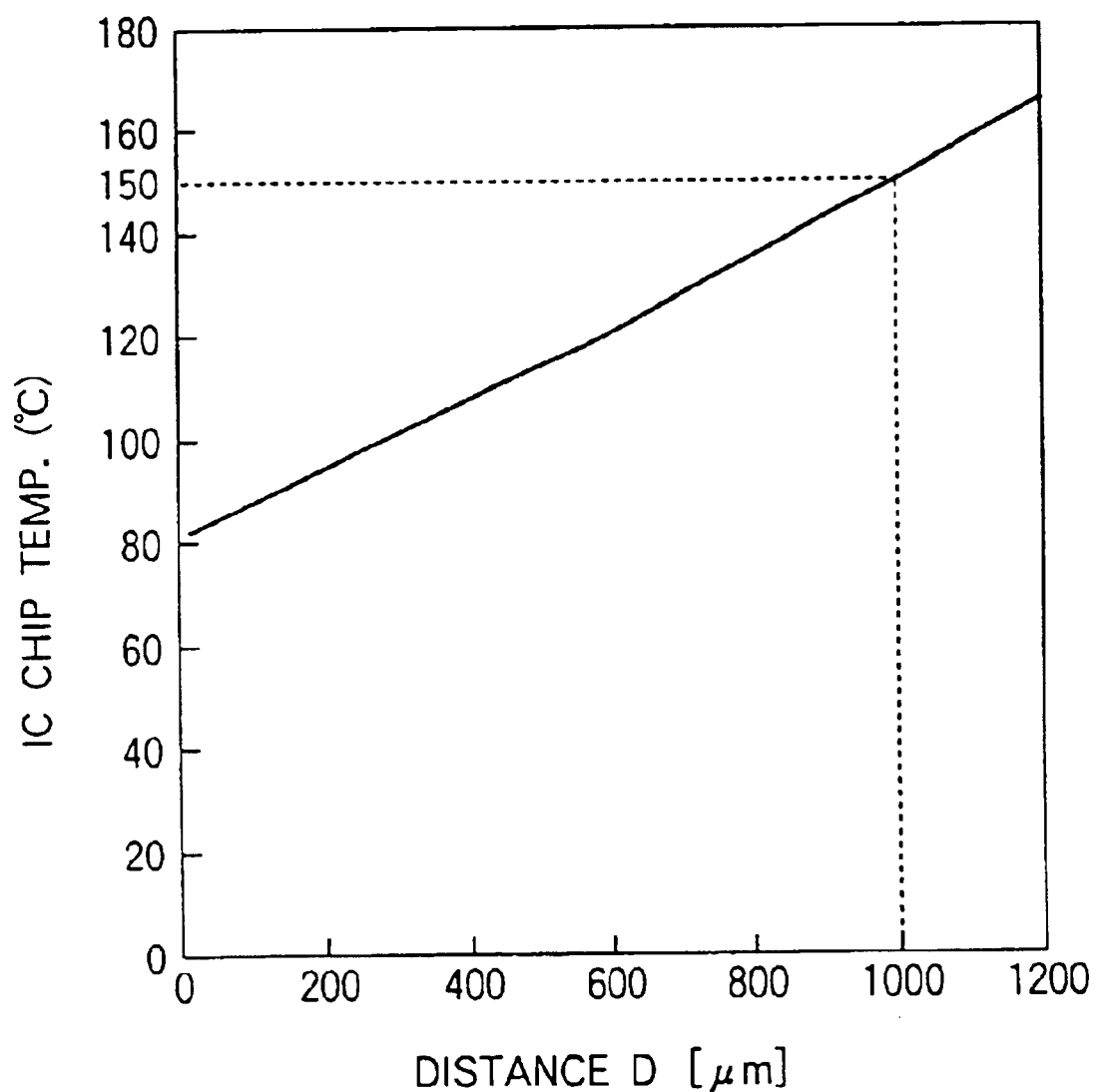
FIG. 10 is a diagram showing the temperature change in the head IC chip in reflation to the distance between the opposing surfaces of the IC chip and the magnetic recording disc.

The inventors have noticed through research that, with the distance D between the IC chip 20 and the surface of the magnetic disc 10 facing the IC chip 20 not larger than 1000 µm, it is possible to maintain the temperature of the IC chip 20 at a sufficiently low value, for example below 150° C. FIG. 10 shows changes in temperature in the IC chip 20 with respect to the distance D between the IC chip 20 and the surface of the magnetic disc 10 facing the IC chip 20. The data shown in FIG. 10 is the one which has been obtained through a relatively severe condition wherein the write current of 40 mA is continuously supplied under an environmental temperature of 50° C. which corresponds to the working temperature in the magnetic disc device. It is generally understood that the permissible temperature at the junctions in the IC of the chip is 150° C. at the highest. If the IC is operated for an extended time under a temperature exceeding 150° C., transistor junctions or other parts may gradually be led to failure. As noted in FIG. 10, however, it is possible to maintain the temperature of the IC chip 20 below the critical temperature of 150° C. by maintaining the distance D not larger than 1000 µm.

With the structure adopting the bare chip element for the head IC chip 20 and mounting the head IC chip by flip-chip bonding, the overall height of the head IC chip as mounted can be kept to a lower value. More specifically, referring to FIG. 4, it is recommendable to provide the relationship H1<H2 where H1 is the height of the head IC chip 20 as mounted as measured from the upper surface of the load beam 31 and H2 is the height of the slider 19 as mounted as measured from the upper surface of the load beam 31. It will thus be noted that even with the structure where the head IC chip 20 is mounted on the suspension structure 18 at the side facing to the magnetic disc 10, it is possible to completely avoid any interference between the head IC chip 20 and the surface of the magnetic disc 10.

Figure 11:
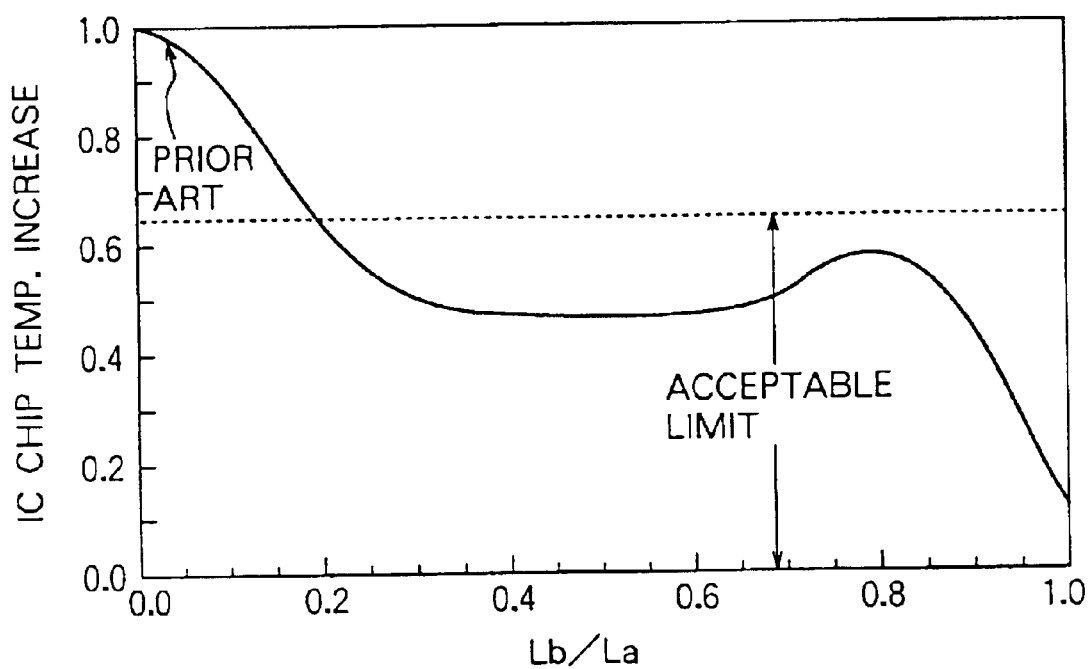
FIG. 11 is a diagram showing the relationship between the location of the head IC chip and the temperature of the head IC chip in operation.
Figure 12:
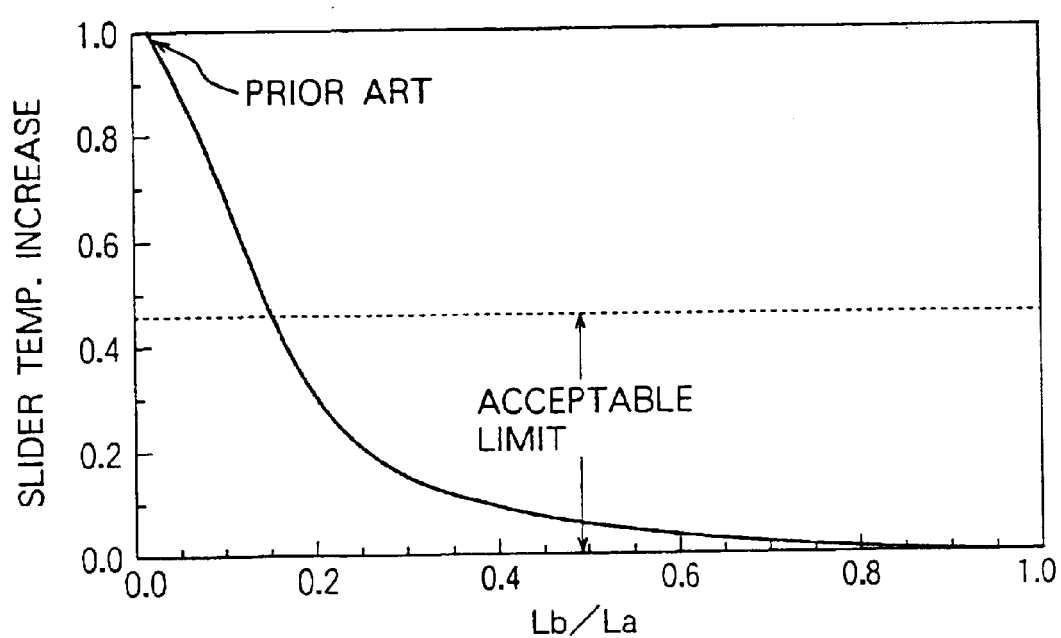
FIG. 12 is a diagram showing the relationship between the location of the head IC chip and the temperature of the slider during operation.

It is preferable to determine the distance Lb between the slider 19 and the head IC chip 20 and the distance La between the slider 19 and the mounting point 38 of the suspension structure 18 as shown in FIG. 3 so that the ratio Lb/La is in the range between 0.2 and 1. In FIG. 11, there is shown a relationship between the temperature in the head IC chip 20 during operation and the ratio Lb/La. In FIG. 12, there is shown a relationship between the temperature in the slider 19 during operation and the ratio Lb/La. In these figures, it will be noted that the temperature in the head IC chip 20 as well as that in the slider 19 will increase beyond a permissible value when the head IC chip 20 is located too close to the slider 19.

As shown in FIG. 11, the temperature in the head IC chip 20 decreases as the location of the head IC chip 20 is moved away from the slider 19 and the temperature will become below the permissible limit when the ratio Lb/La increases up to 0.2. As the location of the head IC chip 20 is moved further away from the slider 19 beyond this point, the temperature of the head IC chip is further decreased and maintained at a substantially constant value in the range of the ratio Lb/La between 0.4 and 0.6. Thereafter, as the location of the head IC chip 20 is moved further away from the slider 19, the temperature in the head IC chip 20 shows a tendency of gradual increase to reach a peak value at the ratio Lb/La of 0.8 to again decrease.

In FIG. 11, it will be noted that the temperature in the head IC chip 20 in operation is below the acceptable upper limit with $Lb/La \geq 0.2$ and the temperature is lower in the range $0.3 \leq LB/La \leq 0.7$ than at the Lb/La value of 0.2. It should further be noted that more preferable results can be obtained with the range $0.4 \leq Lb/La \leq 0.6$. As far as the temperature of the head IC chip 20 is concerned, a preferable result can be obtained with the location of the head IC chip 20 closer to the point 38 of the attachment. However, locating the head IC chip 20 too far from the magnetic head is not recommendable. Therefore, the permissible range for the location of the head IC chip 20 is $0.2 \leq Lb/La \leq$, preferably, $0.3 \leq LB/La \leq 0.7$ and more preferably $0.4 \leq Lb/La \leq 0.6$.

In FIG. 11, it will further be noted that the temperature of the head IC chip 20 in operation shows a low value with the head IC chip 20 located in the vicinity of the longitudinal center of the suspension structure 18. It is understood that this tendency is derived from the fact that the heat in the head IC chip 20 is conducted in opposite directions along the length of the suspension structure 18 both toward the base portion and the tip end thereof. This tendency has been confirmed with the TYPE 1930 and TYPE 830 suspension structures, however, it is understood that this tendency will be seen in any type of suspension structures.

As shown in FIG. 12, the temperature of the slider 19 in operation decreases as the location of the head IC chip 20 is away from the slider 19. It will therefore be understood that the location of the head IC chip 20 in the range as described above is also effective to maintain the temperature of the slider 19 and therefore the temperature of the magnetic head 39 within the permissible range.

As regards the configuration of the head IC chip 20, it is preferable that the heat radiating area at the side facing the magnetic disc 10 be as large as possible. More specifically, as shown in FIG. 13(A), the IC chip 200 may be a thin flat configuration having a substantial area on the surface 200a facing the magnetic disc 10. In an alternative configuration shown in FIG. 13(B), the IC chip 201 may have an undulated surface configuration at the side facing to the magnetic disc 10. In this instance, it is preferable that recesses in the undulated pattern be directed substantially parallel to the direction of the flow of air. In a still alternative configuration shown in FIG. 13(C), the IC chip 202 may have a rough surface 202a at the side facing to the magnetic disc 10. In a still further alternative structure shown in FIG. 13(D), the IC chip 203 may be provided with a surface 203a facing the magnetic disc 10 having one or more grooves 203b for allowing the flow of air pass through. The groove 203b may have a wide opening toward to the flow of air and a width gradually decreasing toward the other end along the direction of rotation of the magnetic disc 10. Still further, although not shown in the drawings, the IC chip may be provided at a side facing the magnetic disc 10 with fins or projections which may increase the capability of heat radiation.

In order that the heat dissipation be enhanced by any one of the surface configurations of the head IC chip as shown in FIG. 13, it is advisable to mount the IC chip by flip-chip bonding on the suspension structure as already described.

Figure 14:
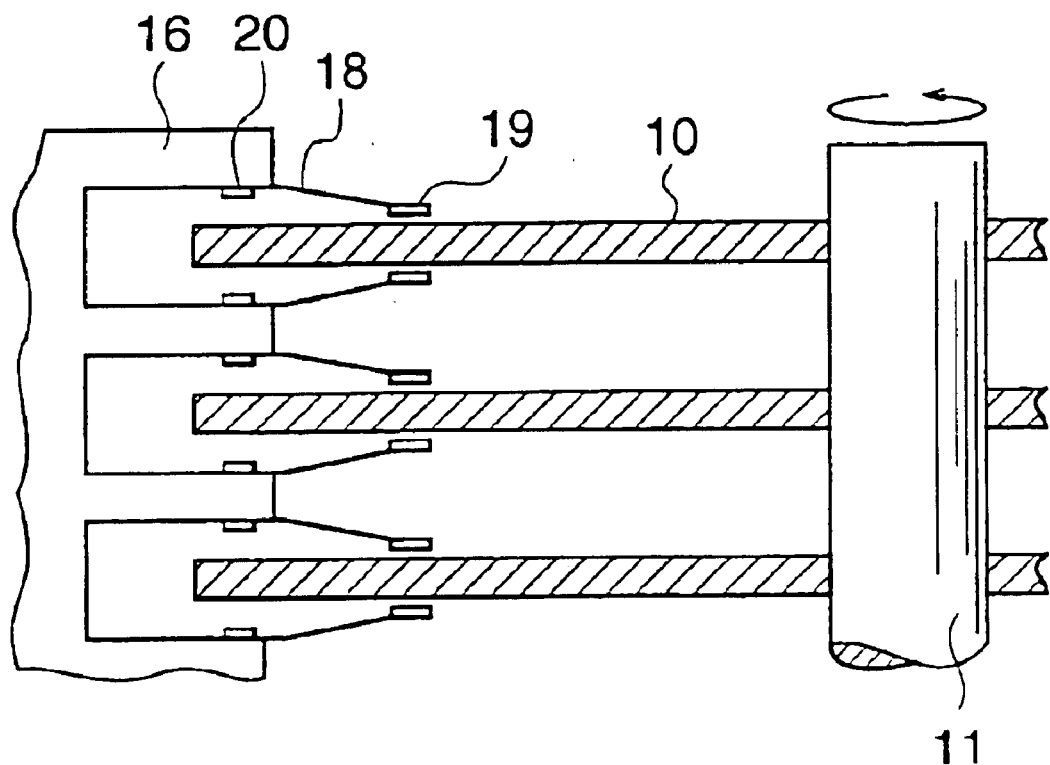
FIG. 14 is a side view of the structure around the carriage assembly.

Referring now to FIG. 14, there is shown the structure around the carriage assembly in the magnetic disc device in accordance with another embodiment of the present invention.

In the structure illustrated therein, the head IC chip 20 is not mounted on the suspension structure 18 but mounted on the connecting lead member such as the flexible print cord 21 which is connected with an internal circuit of the magnetic disc device. It should however be noted that, in this structure, the IC chip 20 is located inside the outer periphery of the magnetic recording disc 10 during operation and is opposed to the magnetic recording disc 10. The connecting lead member such as the flexible print cord 21 may be secured to the movable arm 16 or, alternatively, held apart from the movable arm 16.

Thus, it will be noted that the head IC chip 20 is located at a position on the connecting lead member where the IC chip 20 is subjected during operation to the flow of air produced by the rotation of the magnetic disc 10. It will therefore be understood that the IC chip 20 receives always a cooling action by the flow of air throughout the stroke of the movement of the magnetic head for seeking operation between the inner and outer peripheries of the magnetic disc 10. As the result, it is possible to decrease temperature increase in the IC chip to a substantial extent.

Figure 15:
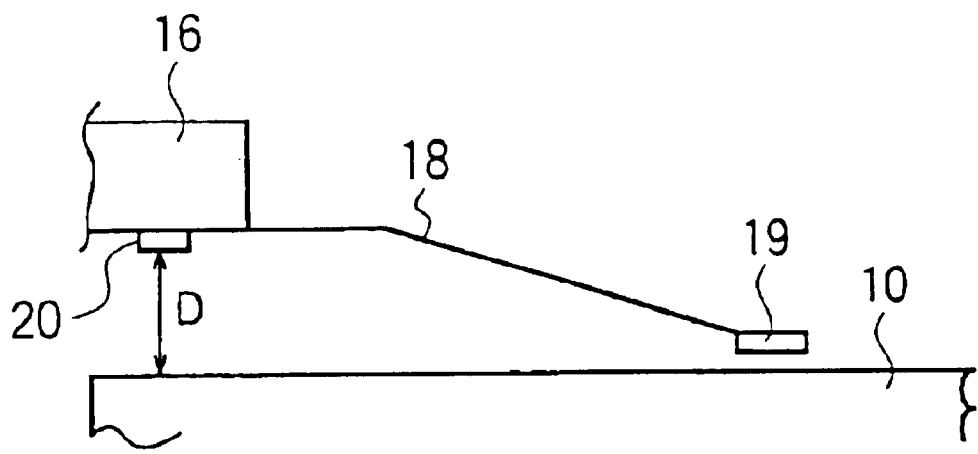
FIG. 15 is a diagrammatical illustration similar to FIG. 9 but showing another example of the distance D.

In order to cool the head IC chip effectively by the flow of air produced by the rotation of the magnetic disc 10, it is preferable that the distance D between the IC chip 20 and the surface of the magnetic disc 10 facing the IC chip 20 as shown in FIG. 15 be maintained as small as possible. In this instance, care must be taken so that any interference between the IC chip 20 and the adjacent surface of the magnetic disc 10 is avoided. As in the embodiment of FIG. 1, it is possible in the present embodiment to maintain the temperature of the IC chip 20 below 150° C. with the distance D between the IC chip 20 and the adjacent surface of the magnetic disc 10 not larger than 1000 $\mu$m.

In other respects, the structure and function of this embodiment are the same as those in the embodiment of FIG. 1.

It should be noted that the embodiments illustrated and described above are examples only but not restrictive, so that it should be understood that the invention can be put into practice with changes and modifications in various ways. Therefore, the invention shall be limited only by the scope of the appended claims and its equivalents.

What is claimed is:

1. A method of fabricating a magnetic disc device comprising a magnetic head device including a slider having a magnetic head element and a suspension structure having one end supporting the slider, a head IC chip which is a separately-formed component from the slider, a rotatable magnetic disc which is rotated at least when the head IC chip is in operation, and an electrically conductive connecting device for establishing an electrical connection between the magnetic head element and the head IC chip, the method including the steps of:

mounting the head IC chip on the connecting device at a mounting position so as to face the magnetic disc; and selecting the mounting position of the head IC chip to be located on the connecting device where the head IC chip is always exposed to a flow of air produced by rotations of the magnetic disc so that the head IC chip is continuously cooled by the flow of air at least when the head IC chip is in operation.

2. The method of claim 1 wherein the step of mounting the head IC chip on the suspension structure includes mounting the head IC chip which is a bare chip.

3. The method of claim 1 wherein the step of mounting the head IC chip on the suspension structure includes mounting the head IC chip on the suspension structure by flip-chip-bonding.

4. The method of claim 1 wherein the step of mounting the head IC chip on the suspension structure includes mounting the head IC chip which has a mass smaller than 1.0 mg.

5. The method of claim 1 wherein the step of selecting the mounting position of a head IC chip includes selecting the mounting position of the head IC chip so that the head IC chip is located inside an outer periphery of the magnetic disc at least when the head IC chip is in operation.

6. The method of claim 1, further comprising:

arranging for the head IC chip to be located with respect to the magnetic disc with a distance between opposing surfaces of the head IC chip and the magnetic disc smaller than 1000 μm.

7. The method of claim 6, wherein the step of mounting a head IC chip on the suspension structure includes mounting the head IC chip which is a bare chip.

8. The method of claim 6 wherein the step of mounting a head IC chip on the suspension structure includes mounting the head IC chip on the suspension structure by flip-chip-bonding.

9. The method of claim 6 wherein the step of mounting the head IC chip on the suspension structure includes mounting the head IC chip which has a mass smaller than 1.0 mg.

10. The method of claim 6 wherein the step of selecting the mounting position of the head IC chip includes selecting the mounting position of the head IC chip so that the head IC chip is located inside an outer periphery of the magnetic disc at least when the head IC chip is in operation.

11. A method of increasing cooling of a head IC chip in a magnetic disc device comprising a magnetic head device including a slider having magnetic head element and a suspension structure having one end supporting the slider, a head IC chip which is a separately-formed component from the slider, a rotatable magnetic disc which is rotated at least when the head IC chip is in operation, and an electrically conductive connecting device for establishing an electrical connection between the magnetic head element and the head IC chip, the method including the steps of:

mounting the head IC chip on the connecting device at a mounting position so as to face the magnetic disc; and selecting the mounting position of the head IC chip to be located on the connecting device where the head IC chip is always exposed to a flow of air produced by rotations of the magnetic disc so that the head IC chip is continuously cooled by the flow of air at least when the head IC chip is in operation.

12. A method of increasing cooling of a head IC chip in a magnetic disc device comprising a magnetic head device including a slider having a magnetic head element and a suspension structure having one end supporting the slider, a head IC chip which is a separately-formed component from the slider, a rotatable magnetic disc which is rotated at least when the head IC chip is in operation, and an electrically conductive connecting device for establishing an electrical connection between the magnetic head element and the head IC chip, the method including the steps of:

mounting the head IC chip on the connecting device at a position so as to face the magnetic disc;

selecting the mounting position of the head IC chip to be located on the connecting device where the head IC chip is always exposed to a flow of air produced by rotations of the magnetic disc so that the head IC chip is continuously cooled by the flow of air at least when the head IC chip is in operation; and arranging for the head IC chip to be located with respect to the magnetic disc with a distance between opposing surfaces of the head IC chip and the magnetic disc smaller than 1000 μm.

* * * * *